United States Patent
Lo (10) Patent No.: US 7,278,039 B1
(45) Date of Patent: Oct. 2, 2007

(54) PHYSICAL LAYER ENERGY SAVING TECHNIQUE FOR TRANSCEIVERS

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 11/254,986

(22) Filed: Oct. 20, 2005

Related U.S. Application Data (62) Division of application No. 09/990,137, filed on Nov. 21, 2001, now Pat. No. 6,993,667.

(60) Provisional application No. 60/256,117, filed on Dec. 15, 2000.

(51) Int. Cl.
*G06F 1/32* (2006.01)

(52) U.S. Cl. .............. 713/320; 713/300; 713/323; 713/324; 370/287; 370/318; 370/433; 370/463

(58) Field of Classification Search .............. None
See application file for complete search history.

(56) References Cited

U.S. PATENT DOCUMENTS

| | | |
|---|---|---|
| 5,404,544 A | 4/1995 | Crayford |
| 5,610,903 A | 3/1997 | Crayford |
| 5,742,833 A | 4/1998 | Dea et al. |
| 5,884,041 A | 3/1999 | Hurwitz |
| 5,907,553 A | 5/1999 | Kelly et al. |
| 5,922,052 A | 7/1999 | Heaton |
| 6,026,494 A | 2/2000 | Foster |
| 6,169,475 B1 | 1/2001 | Browning |
| 6,215,764 B1 | 4/2001 | Wey et al. |
| 6,442,142 B1 | 8/2002 | Bar-Niv |
| 6,618,392 B1 * | 9/2003 | Bray .................. 370/465 |
| 6,622,178 B1 | 9/2003 | Burke et al. |
| 6,795,450 B1 | 9/2004 | Mills et al. |
| 6,883,025 B2 | 4/2005 | Andra et al. |
| 7,127,624 B2 * | 10/2006 | Berman et al. ........ 713/320 |
| 2002/0157030 A1 * | 10/2002 | Barker et al. ......... 713/320 |
| 2004/0066301 A1 | 4/2004 | Browning |

OTHER PUBLICATIONS

IEEE Std 802.3-2002 (Revision of Std 802.3, 2000 Edition), IEEE Standard for Information technology—Telecommunications and information exchange between systems—Local and metropolitan area networks—Specific requirements, Part 3: Carrier sense multiple access with collision detection (CSMA/CD) access method and physical layer specifications; IEEE Computer Society, Sponsored by the LAN/MAN Standards Committee, Mar. 8, 2002; 1538 pages.

* cited by examiner

*Primary Examiner*—Rehana Perveen
*Assistant Examiner*—Nitin C. Patel (57) ABSTRACT

A first physical layer device of a first network device includes a sense circuit that senses activity on a medium and with the first physical layer device. An autonegotiation circuit attempts to establish a connection with a second physical layer device of a second network device within a first period after the sense circuit senses activity. An energy saving circuit selectively provides power to the first physical layer device based on the sensed activity and connection with the second physical layer device, and that while attempting to establish the connection resets a timer associated with the first period when the sense circuit senses activity.

27 Claims, 7 Drawing Sheets

Figure 1

Prior Art

PHYSICAL LAYER ENERGY SAVING TECHNIQUE FOR TRANSCEIVERS

CROSS-REFERENCE TO RELATED APPLICATIONS

The present application is a divisional of application Ser. No. 09/990,137 filed on Nov. 21, 2001 now U.S. Pat. No. 6,993,667 which claims priority from U.S. Provisional Application Ser. No. 60/256,117, filed on Dec. 15, 2000 which are both hereby incorporated by reference in their entirety.

FIELD OF THE INVENTION

The present invention relates to network devices, and more particularly to energy saving circuits that are associated with the physical layer of network devices.

BACKGROUND OF THE INVENTION

Servers, storage devices, computers, printers, switches and other electronic devices are often connected together to form a network to allow the exchange of data. The network devices include a physical layer that usually includes network cards and cables that establish and maintain the connection between the network devices. In 10BASE-T, 100 BASE-TX, and 1000BASE-T networks, the physical layer executes autonegotiation protocols that initiate the data link between the network devices. Once the data link is lost, the physical layer notifies the network device. The cable usually provides the physical connection between the physical layers of network devices.

During autonegotiation, bursts of pulses called fast link pulse (FLP) bursts are transmitted and received periodically by the physical layer. The purpose of the FLP bursts is to detect the presence of another network device and to initiate the exchange of data between the network devices. The initialization information typically includes configuration information such as the communication speed(s) that are available and other information that will be necessary for subsequent communications between the network devices.

When a physical layer of a network device is not connected to another network device, the physical layer still periodically transmits FLP bursts in an attempt to initiate connections to other network devices. FLP bursts usually include 17 to 33 link pulses that are generated every 16 ms. The physical layer remains powered up while attempting to connect to another network device.

Laptop computers are sensitive to the use of power due to the limited power that is available from the batteries. Continuously powering the physical layer when the laptop computer is not already connected to another network device is not an efficient use of the laptop computer's battery power. One way to reduce power consumption is for the laptop computer to completely power down the physical layer when the laptop computer is not connected to another network device. However, if another network device is attempting to establish a data link with the laptop computer, there is no way for the powered-down physical layer to detect the presence of the other network device. Even when the network device is not battery powered, reducing power consumption reduces heat that is generated by the network device.

SUMMARY OF THE INVENTION

A physical layer device comprises a sense circuit that senses activity on a medium. An autonegotiation circuit attempts to negotiate a link with a second physical layer device of a second network device after the sense circuit senses activity. An energy saving circuit selectively provides power to the physical layer device based on the sensed activity, times a first period which is reset when the sense circuit senses activity, and powers down the physical layer device when the autonegotiation circuit fails to establish the link with the second physical layer device within the first period.

In other features, a link circuit communicates with the autonegotiation circuit and triggers the link state when autonegotiation is complete and a link with the second physical layer device is established. The link circuit generates a link lost signal when the link is lost.

A physical layer device comprises a transmitter and a receiver. A sense circuit communicates with the transmitter and the receiver, senses activity on a medium and times a second period which is reset when activity is sensed. An autonegotiation circuit attempts to negotiate a link with a second physical layer device of a second network device after the sense circuit senses activity. An energy saving circuit selectively provides power to the physical layer device based on the sensed activity. The sense circuit turns on the transmitter after the second period, the transmitter generates a signal on the medium, and the sense circuit turns off the transmitter.

In other features, the second period is longer than a period of fast link pulse bursts.

A physical layer device comprises a sense circuit that senses activity on a medium. A autonegotiation circuit attempts to negotiate a link with a second physical layer device of a second network device after the sense circuit senses activity. An energy saving circuit selectively provides power to the physical layer device based on the sensed activity. A switching circuit senses a connection configuration of the second physical layer device and that adjusts an MDI/MDIX connection configuration of the physical layer device to complement the MDI/MDIX connection configuration of the second physical layer device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
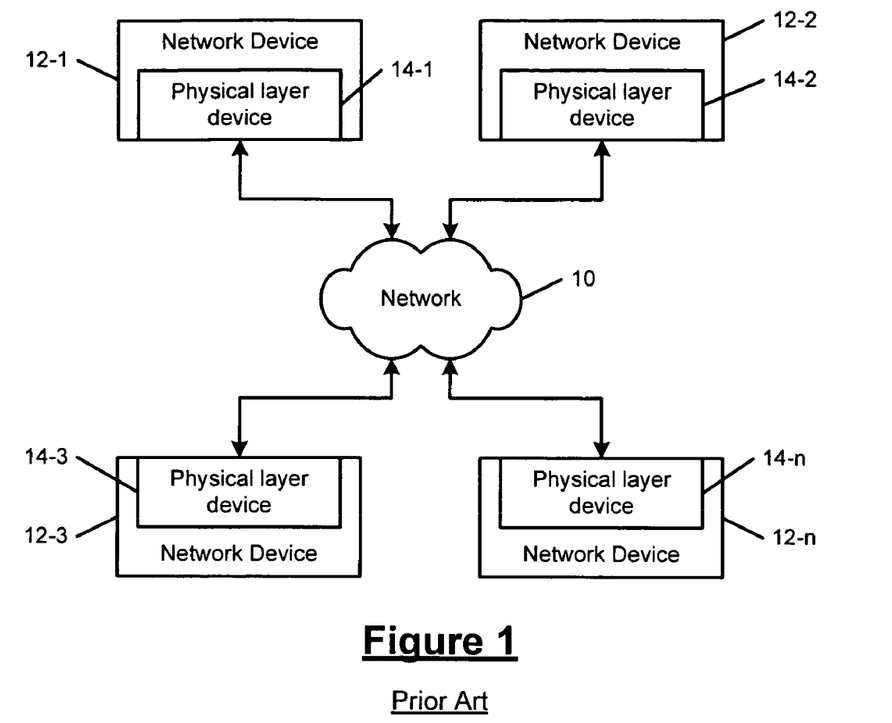
FIG. 1 illustrates a plurality of network devices according to the prior art that include physical layers.

Referring now to FIG. 1, a network 10 according to the prior art is connected to a plurality of network devices 12-1, 12-2, . . . , and 12-n. Each of the network devices 12-1, 12-2, . . . , and 12-n includes a physical layer 14-1, 14-2, . . . , and 14-n, respectively, that is responsible for establishing and maintaining a communications link between the communicating network devices 12. In situations where a single network device, such as network device 12-1, is not connected to any other network devices, the network device 12-1 provides power to the physical layer 14-1 even though it is not presently communicating with any other network devices 12.

Figure 2:
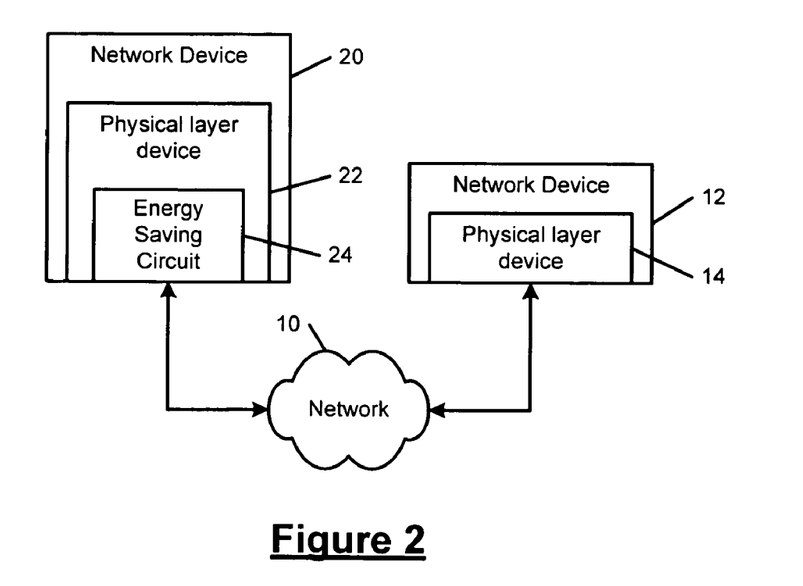
FIG. 2 illustrates a network device according to the present invention including a physical layer with an energy saving circuit.

Referring now to FIG. 2, a network device 20 according to the present invention includes a physical layer 22 and an energy saving circuit 24. The energy saving circuit 24 can be implemented as a digital circuit, an analog circuit, a processor and software, an application specific integrated circuit (ASIC) or any other suitable circuit. In situations where the network device 20 is not connected to any other network devices, the energy saving circuit 24 reduces power consumption of the physical layer 22 as will be described more fully below.

Figure 3:
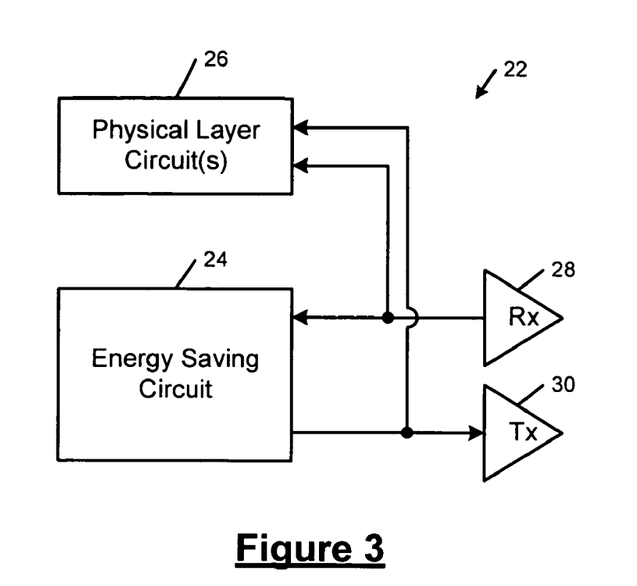
FIG. 3 illustrates the energy saving circuit, other physical layer circuits, a receiver and a transmitter.
Figure 4:
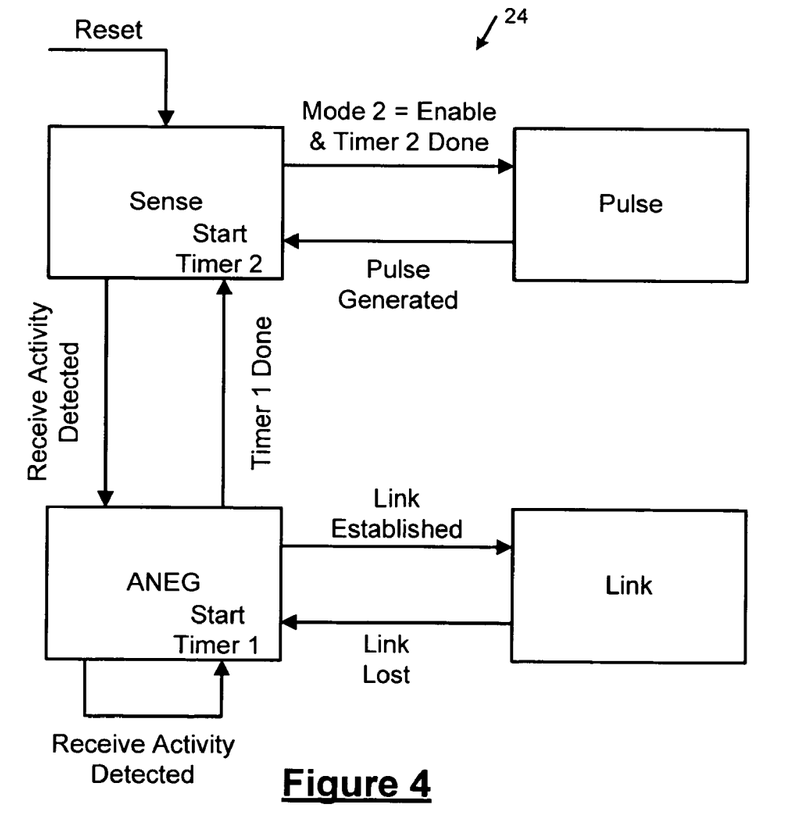
FIG. 4 illustrates the operation of the energy saving circuit of FIG. 2 in further detail.
Figure 5:
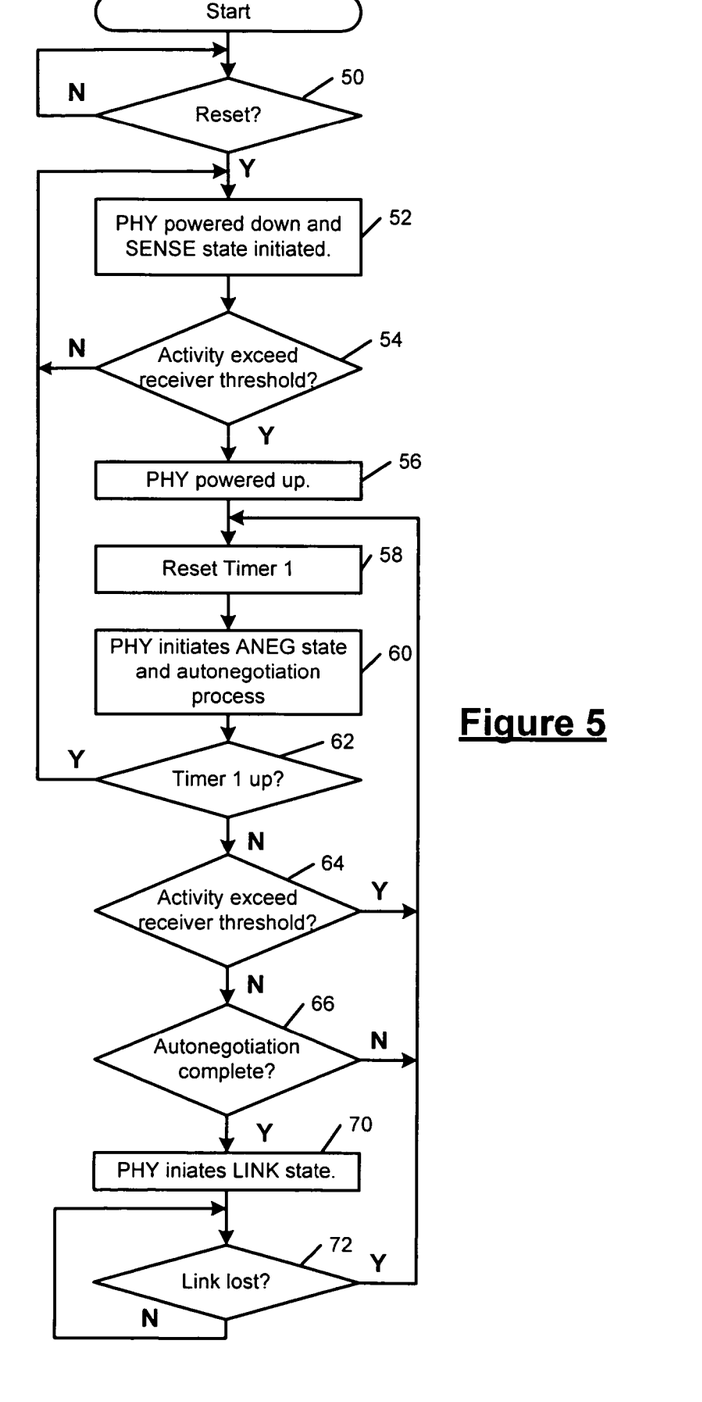
FIG. 5 is a flowchart illustrating steps that are performed in a first energy saving mode.

Referring now to FIGS. 3, 4 and 5, the energy saving circuit 24 is connected to one or more physical layer circuits 26, a receiver 28 and a transmitter 30. The physical layer circuits 26 perform conventional functions of the physical layer other than the energy saving modes of the present invention. The energy saving circuit 24 enters a SENSE state when reset (steps 50 and 52). In the SENSE state, the physical layer 22 is powered down (step 52) except for the energy saving circuit 24 and the receiver 28. The receiver 28 is preferably an Ethernet receiver such as a 10BASE-T receiver that draws very little power.

When connection activity exceeding a receiver threshold that is set by the receiver 28 or the sense circuit is detected (step 54), the energy saving circuit 24 moves into an ANEG state. In the ANEG state, the physical layer 22 is powered up (step 56) and a first timer (TIMER 1) is started (step 58). During autonegotiation, the physical layer 22 attempts to establish a connection (step 60) with other network devices 12. The first timer TIMER1 times out after a first predetermined period unless reset (step 62). While in the ANEG state, the first timer TIMER1 is reset every time additional connection activity exceeding the receiver threshold is detected by the receiver 28 (step 64).

If the connection activity that was detected by the receiver 28 was a noise hit and there are no active network devices 12 that are connected to the network device 20, the first timer TIMER1 will eventually time out. In a preferred embodiment, the first predetermined period of the first timer TIMER1 is set to approximately 1-5 seconds. When the first timer TIMER1 times out, the energy saving circuit 24 returns to the SENSE state (step 52). If there is an active network device 12 attempting to establish communications, autonegotiation will complete (step 66) and the energy saving circuit 24 will enter a LINK state (step 70). In the LINK state, the physical layer 22 is powered up and operates normally.

If the physical layer 22 loses the connection (step 72), the physical layer 22 will move from the LINK state to the ANEG state and try to re-establish the connection (step 58). This method of control allows the physical layer 22 to automatically power up and down based on whether connection activity is present. As can be appreciated, energy is saved by powering down the physical layer 22 as described above.

Figure 6:
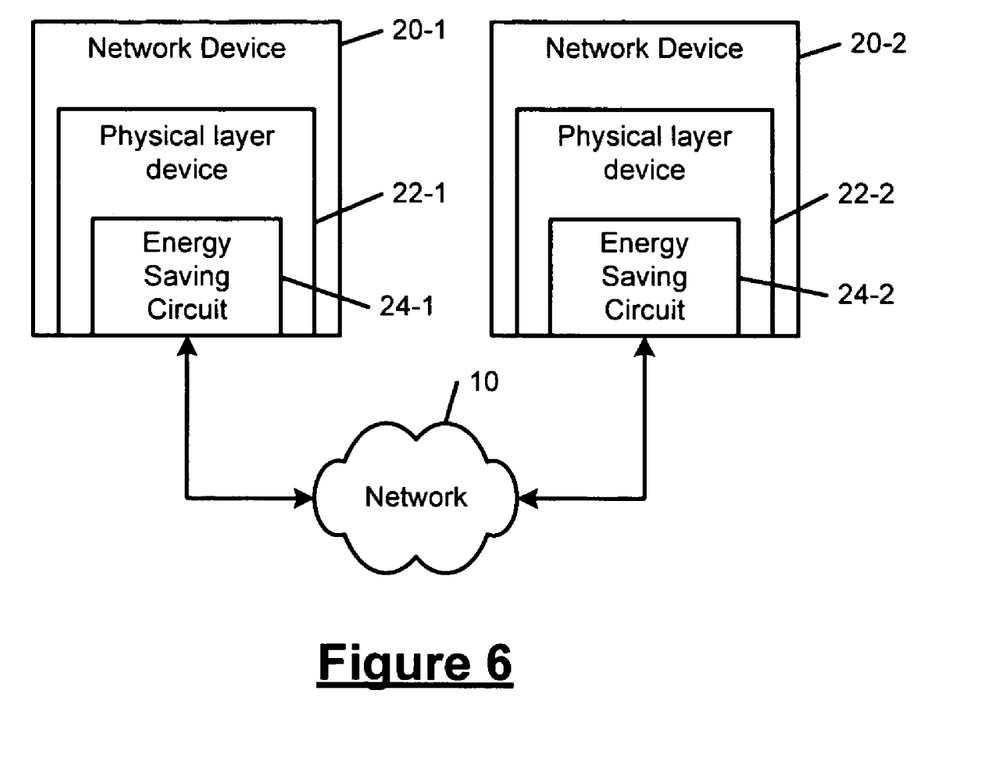
FIG. 6 illustrates two network devices according to the present invention that are connected to a network.
Figure 7:
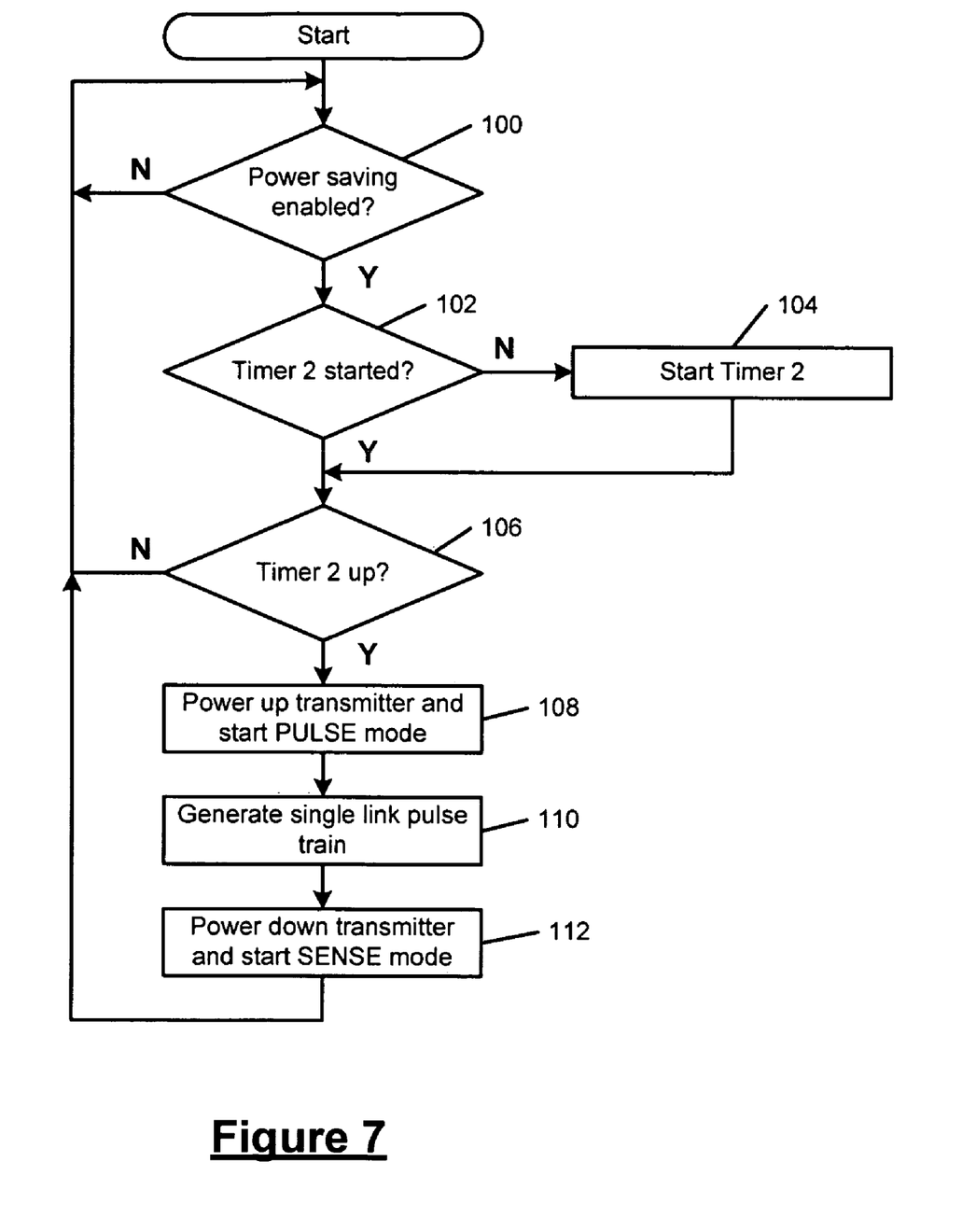
FIG. 7 is a flowchart illustrating steps that are performed in a second energy saving mode.

Referring to FIGS. 6 and 7, a second energy saving mode of the energy saving circuit 24-1 of FIG. 2 is shown. In the second energy saving mode, the physical layer 22-1 periodically transmits a single link pulse. A physical layer 22-1 with the second energy saving mode enabled can detect a link pulse from another physical layer 22-2 that has the second energy saving mode enabled.

The second power saving mode is initially enabled (step 100). A second timer TIMER2 is started (steps 102 and 104). The second timer TIMER2 times out after a second predetermined period. If the second energy saving mode is enabled and the second timer TIMER2 times out (step 106), the energy saving circuit 24 moves into the PULSE state (step 108). In the PULSE state, the transmitter 30 is powered on and a link pulse is generated. Preferably a single link pulse is generated (step 110). After the single link pulse is generated, the energy saving circuit 24 returns to the SENSE state and the transmitter is shut down (step 112).

More power is consumed in the second energy saving mode than in the first energy saving mode because the transmitter link pulses are generated periodically. However, the link pulse transmission is preferably much less frequent than FLP bursts that are generated every 16 ms and that typically include 17 to 33 link pulses. For example, in the second energy saving mode a single link pulse can be generated once per second or at other intervals.

Figure 8:
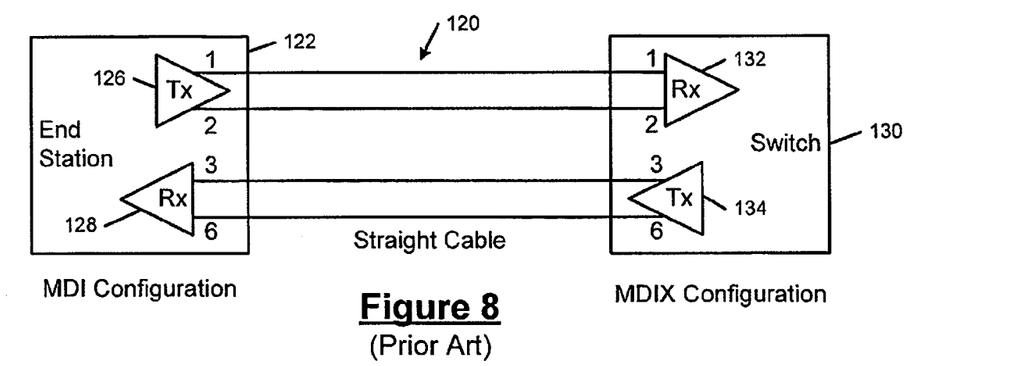
FIG. 8 illustrates the interconnection between a MDIX configuration switch and a MDI configuration end station.
Figure 9:
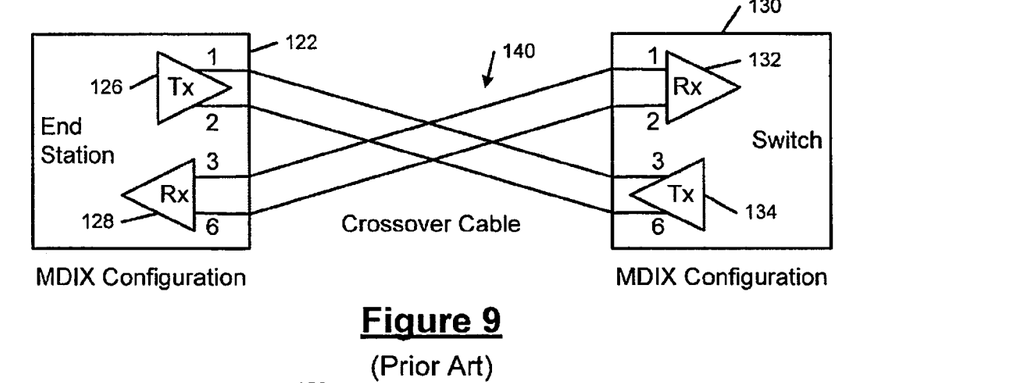
FIG. 9 illustrates a crossover interconnection between a MDIX configuration end station and a MDIX configuration switch.
Figure 10:
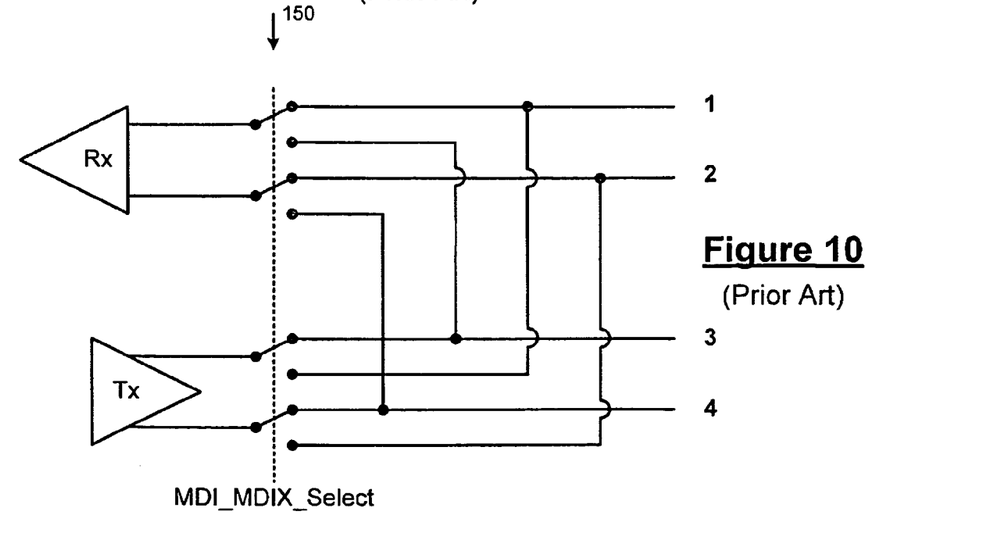
FIG. 10 illustrates a crossover interconnection selector that may be implemented in a physical layer.

Some physical layers implement crossover functions. The first and second energy saving modes can be modified to work in conjunction with these crossover functions. FIG. 8 shows the connection of transmit and receive pairs using an RJ-45 connector 120. In a MDI configuration, an end station 122 is configured with pins 1 and 2 as a transmitter 126 and pins 3 and 6 as a receiver 128. A switch 130 is configured with pins 1 and 2 as a receiver 132 and pins 3 and 6 as a transmitter 134. A connection between the switch 130 and the end station 122 requires the connector 120 that provides a straight cable connection. However, the two switches in FIG. 9 require a connection 140 that provides a crossover. Some physical layers employ a crossover interconnection selector inside of the physical layer as shown in FIG. 10. Depending on the cable that is used, the physical layer automatically detects and selects the correct pins to use by toggling switches 150. The crossover function is defined more fully in IEEE 802.3, which is hereby incorporated by reference. In particular, Section 40.4.4-40.4.6 of IEEE 802.3 address the crossover capability.

Figure 11:
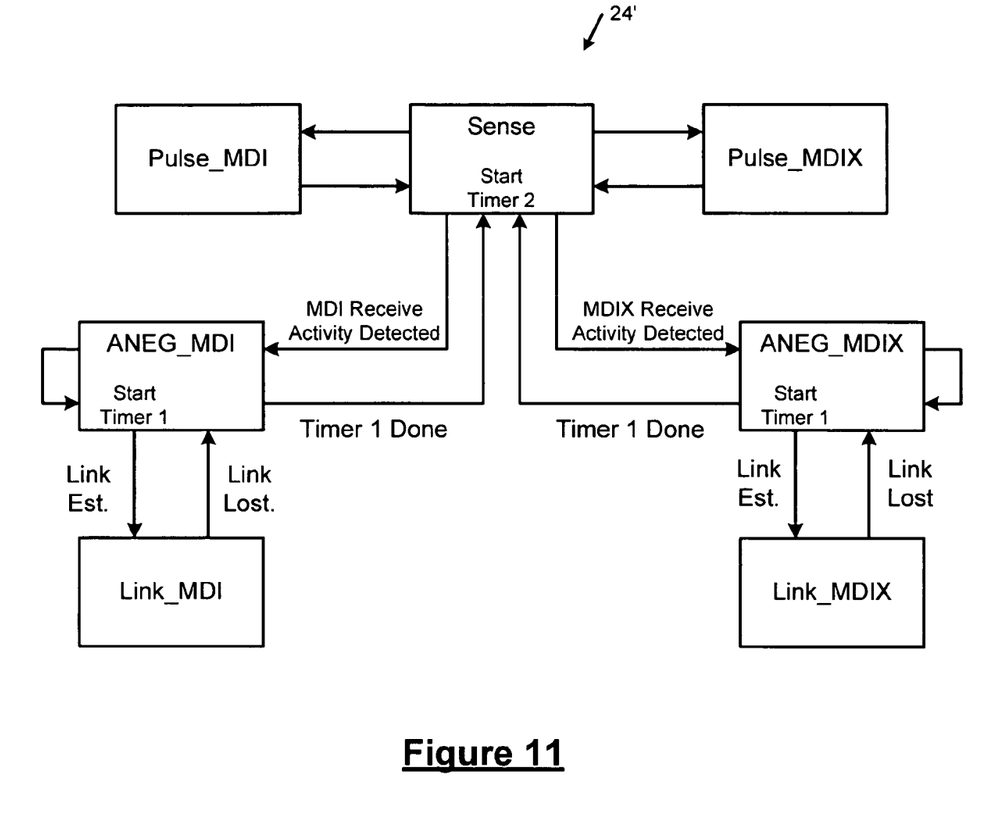
FIG. 11 illustrates an embodiment of an energy saving scheme with crossover capability.

Referring now to FIG. 11, an energy saving circuit 24' with crossover capability is illustrated. The energy saving circuit 24' is able to distinguish the source of the connection activity. In other words the energy saving circuit 24' determines whether the connection activity is transmitted by the MDI receiver (pins 3 and 6) or by the MDIX receiver (pins 1 and 2). The energy saving circuit 24' is operated in a manner that is similar to the energy saving circuit 24 that is illustrated in FIG. 4. However, the ANEG_MDI state or the ANEG_MDIX state are selected depending on the source of the connection activity. In the case of ANEG_MDI and LINK_MDI, the physical layer 22' operates in the MDI configuration. In the case of ANEG_MDIX and LINK_MDIX, the physical layer 22' operates in the MDIX configuration.

In the second energy savings mode, the physical layer 22' randomly selects the MDI or MDIX configuration and transmits the link pulse on the appropriate ports. If the MDI configuration is selected, the energy saving circuit 24' enters a PULSE_MDI state and generates a link pulse on the MDI transmitter (pins 1, 2). If the MDIX configuration is selected, the energy saving circuit 24' enters a PULSE_MDIX state and generates a link pulse on the MDIX transmitter (pins 1, 2). If two devices implement the auto crossover function and the second energy saving mode, the random generation of link pulses in the MDI and MDIX configurations will eventually allow each device to recognize the activity of the other device.

Preferably an interrupt signal is generated whenever the physical layer 22' transitions between the SENSE and ANEG states. The interrupt signal is used to shut down additional circuitry, such as an Ethernet controller, while the physical layer 22' is in the SENSE state. Shutting down the additional circuitry permits the energy saving circuit 24' to save additional power. Once the physical layer 22' goes into the ANEG state, the interrupt signal is generated to let the energy saving circuit 24' know that it needs to power up. Similarly, when the physical layer 22' transitions from the ANEG state to the SENSE state, an interrupt signal is generated to let the physical layer 22' know that it should power down.

Thus it will be appreciated from the above, the present invention discloses an energy saving circuit and method for providing energy savings for Ethernet transceivers. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A first physical layer device of a first network device, comprising:
 a sense circuit that senses activity on a medium and with said first physical layer device;
 an autonegotiation circuit that attempts to establish a connection with a second physical layer device of a second network device within a first period after said sense circuit senses activity; and
 an energy saving circuit that selectively provides power to said first physical layer device based on said sensed activity and connection with said second physical layer device, and that while attempting to establish said connection resets a timer associated with said first period when said sense circuit senses activity.

2. The physical layer device of claim 1 further comprising a link circuit that communicates with said autonegotiation circuit and that triggers a link state when autonegotiation is complete and a link with said second physical layer device is established.

3. The physical layer device of claim 2 wherein said link circuit generates a link lost signal when said link is lost.

4. The first physical layer device of claim 1 wherein said energy saving circuit, while attempting to establish said connection, resets a timer associated with said first period when said sense circuit senses activity that exceeds a threshold.

5. The first physical layer device of claim 1 wherein said energy saving circuit powers down said first physical layer device when said autonegotiation circuit fails to establish said connection with said second physical layer device within said first period.

6. A first physical layer device of a first network device, comprising:
 a transmitter;
 a receiver;
 a sense circuit that communicates with said transmitter and said receiver, that senses activity on a medium and that times a period;
 an autonegotiation circuit that attempts to negotiate a link with a second physical layer device of a second network device; and
 an energy saving circuit that selectively provides power to said first physical layer device based on said sensed activity,
 wherein said sense circuit turns on said transmitter after said period, said transmitter generates a signal on the medium, and said sense circuit turns off said transmitter.

7. The physical layer device of claim 6 wherein said second period is longer than a period of fast link pulse bursts.

8. The physical layer device of claim 6 wherein said transmitter is depowered when another period is expired.

9. The physical layer device of claim 6 wherein said transmitter is depowered when a link is nonexistent between said first and second physical layer devices.

10. The physical layer device of claim 6 wherein said period is greater than 16 ms.

11. The physical layer device of claim 6 wherein said signal includes less than 17 pulses.

12. A first physical layer device of a first network device, comprising:
 a sense circuit that senses activity on a medium and with said first Physical layer device;
 an autonegotiation circuit that attempts to establish a connection with a second physical layer device of a second network device within a first period after said sense circuit senses activity;
 an energy saving circuit that selectively provides power to said first physical layer device based on said sensed activity and connection with said second physical layer device, and that resets a timer associated with said first period and maintains power on said first physical layer device when connection activity is less than a threshold.

13. The physical layer device of claim 12 further comprising a switching circuit that senses a connection configuration of said second physical layer device and that adjusts at least one of a medium dependent interface (MDI) and a medium dependent interface crossover (MDIX) connection configuration of said physical layer device to complement at least one of a MDI and a MDIX connection configuration of said second physical layer device.

14. A first physical layer device of a first network device, comprising:
sensing means for sensing activity on a medium and with said first physical layer device;
autonegotiation means for attempting to establish a connection with a second physical layer device of a second network device within a first period after said sensing means senses activity; and
energy saving means for selectively providing power to said first physical layer device based on said sensed activity and connection with said second physical layer device, and that while attempting to establish said connection resets a timer associated with said first period when said sensing means senses activity.

15. The physical layer device of claim 14 further comprising link means that communicates with said autonegotiation means for triggering a link state when autonegotiation is complete and said link with said second physical layer device is established.

16. The physical layer device of claim 15 wherein said link means generates a link lost signal when said link is lost.

17. A first physical layer device of a first network device, comprising:
transmitting means for transmitting signals on a medium;
receiving means for receiving signals on said medium;
sensing means that communicates with said transmitting means and said receiving means for sensing activity received by said receiving means and for timing a period;
autonegotiation means for attempting to negotiate a link with a second physical layer device of a second network device; and
energy saving means for selectively providing power to said first physical layer device based on said sensed activity,
wherein said sensing means turns on said transmitting means after said period, said transmitting means generates a pulse, and said sensing means turns off said transmitting means.

18. The physical layer device of claim 17 wherein said second period is longer than a period of fast link pulse bursts.

19. A first physical layer device of a first network device, comprising:
sensing means for sensing activity on a medium and with said first physical layer device;
autonegotiation means for attempting to establish a connection with a second physical layer device of a second network device within a first period after said sensing means senses activity;
energy saving means for selectively providing power to said first physical layer device based on said sensed activity and connection with said second physical layer device, and for resetting a timer associated with said first period and maintains power on said first physical layer device when connection activity is less than a threshold.

20. A method of operating a first physical layer device, of a first network device comprising:
sensing activity on a medium and with said first physical layer device;
attempting to establish a connection with a second physical layer device of a second network device within a first period after senses activity;
selectively providing power to said first physical layer device based on said sensed activity and connection with said second physical layer device;
resetting a timer associated with said first period, while attempting to establish said connection, when activity is sensed.

21. The method of claim 20 further comprising triggering a link state when autonegotiation is complete and said link with said second physical layer device is established.

22. The method of claim 21 further comprising generating a link lost signal when said link is lost.

23. A method for operating a first physical layer device of a first network device, comprising:
transmitting signals on a medium using a transmitter;
receiving signals on said medium;
sensing activity received and timing a period;
attempting to negotiate a link with a second physical layer device of a second network device;
selectively providing power to said first physical layer device based on said sensed activity;
powering said transmitter and generating a signal on said medium after said period; and
turning off said transmitter.

24. The method of claim 23 wherein said second period is longer than a period of fast link pulse bursts.

25. A method of operating a first physical layer device of a first network device, comprising:
sensing activity on a medium and with said first physical layer device;
attempting to establish a connection with a second physical layer device of a second network device within a first period after said activity is sensed;
selectively providing power to said first physical layer device based on said sensed activity and connection with said second physical layer device; and
resetting a timer associated with said first period and maintains power on said first physical layer device when connection activity is less than a threshold.

26. A physical layer device, comprising:
a transmitter;
a sense circuit that communicates with a transmitter and a receiver, that senses activity on a medium, and that times a first period; and
an energy saving circuit that selectively provides power to said physical layer device based on said sensed activity,
wherein, after said period, said sense circuit powers said transmitter, said transmitter generates a signal on the medium, and said sense circuit depowers said transmitter to initiate a connection.

27. The physical layer device of claim 26 further comprising an autonegotiation circuit that attempts to negotiate a connection with another physical layer device of another network device within a second timed period.

* * * * *